United States Patent
Whitehead

(10) Patent No.: US 9,939,706 B2
(45) Date of Patent: Apr. 10, 2018

(54) DISPLACED POROUS ELECTRODE FOR FRUSTRATING TIR AND RETURNING LIGHT THROUGH EXIT PUPIL

(71) Applicant: CLEARink Displays LLC, Santa Clara, CA (US)

(72) Inventor: Lorne A. Whitehead, Vancouver (CA)

(73) Assignee: CLEARink Displays, Inc., Fremont, CA (US)

( * ) Notice: Subject to any disclaimer, the term of this patent is extended or adjusted under 35 U.S.C. 154(b) by 0 days.

(21) Appl. No.: 14/777,581

(22) PCT Filed: Mar. 18, 2014

(86) PCT No.: PCT/US2014/030966
§ 371 (c)(1),
(2) Date: Sep. 16, 2015

(87) PCT Pub. No.: WO2014/160552
PCT Pub. Date: Oct. 2, 2014

(65) Prior Publication Data
US 2016/0139478 A1      May 19, 2016

Related U.S. Application Data

(60) Provisional application No. 61/805,391, filed on Mar. 26, 2013.

(51) Int. Cl.
*G02F 1/167* (2006.01)
*G02F 1/133* (2006.01)
(Continued)

(52) U.S. Cl.
CPC ............. *G02F 1/167* (2013.01); *G02B 26/00* (2013.01); *G02B 26/004* (2013.01);
(Continued)

(58) Field of Classification Search
CPC ...... G02F 1/167; G02F 1/13306; G02F 1/195; G02F 2001/1676; G02F 2001/1678;
(Continued)

(56) References Cited

U.S. PATENT DOCUMENTS

| 3,792,308 A | 2/1974 | Ota et al. |
| 3,919,031 A | 11/1975 | White |

(Continued)

FOREIGN PATENT DOCUMENTS

| AT | 333109 T | 8/2006 |
| CA | 2292441 C | 7/2002 |

(Continued)

OTHER PUBLICATIONS

International Search Report and Written Opinion dated Jul. 8, 2014 for PCT Application No. PCT/US2013/049606.

(Continued)

*Primary Examiner* — William R Alexander
(74) *Attorney, Agent, or Firm* — Dianoosh Salehi

(57) ABSTRACT

A brightness enhancing structure for a reflective display incorporates a transparent sheet having an inward hemispherical surface, a backplane electrode, an apertured membrane between the hemispherical surface and the backplane electrode, and a light reflecting electrode on an outward side of the membrane. A voltage source connected between the electrodes is switchable to apply a first voltage to move the particles inwardly through the apertured membrane toward the backplane electrode, and a second voltage to move the particles outwardly through the apertured membrane toward the light reflecting electrode. Movement of the particles toward the light reflecting electrode frustrates total internal reflection of light rays at the hemispherical surface. Movement of the particles toward the backplane electrode permits total internal reflection of light rays at the hemispherical (Continued)

surface, and outward reflection from the light reflecting electrode toward the hemispherical surface of light rays which pass inwardly through the hemispherical surface.

29 Claims, 8 Drawing Sheets

(51) Int. Cl.
G02B 26/00 (2006.01)
G02F 1/19 (2006.01)
(52) U.S. Cl.
CPC .......... *G02F 1/13306* (2013.01); *G02F 1/195* (2013.01); *G02F 2001/1676* (2013.01); *G02F 2001/1678* (2013.01); *G02F 2201/34* (2013.01); *G02F 2203/02* (2013.01); *G02F 2203/023* (2013.01); *G02F 2203/026* (2013.01)
(58) Field of Classification Search
CPC ............. G02F 2201/34; G02F 2203/02; G02F 2203/023; G02F 2203/026; G02B 26/004; G02B 26/00; G09G 3/344
USPC ...................................... 359/222.1
See application file for complete search history.

(56) References Cited

U.S. PATENT DOCUMENTS

| | | |
|---|---|---|
| 4,025,674 A | 5/1977 | Mizuochi |
| 4,071,430 A | 1/1978 | Liebert |
| 4,203,106 A | 5/1980 | Dalisa et al. |
| 4,648,956 A | 3/1987 | Marhsall et al. |
| 4,821,092 A | 4/1989 | Noguchi |
| 5,019,748 A * | 5/1991 | Appelberg ............. H05B 33/10 313/502 |
| 5,319,491 A | 6/1994 | Selbrede |
| 5,359,346 A | 10/1994 | DiSanto et al. |
| 5,396,350 A | 3/1995 | Beeson et al. |
| 5,596,671 A | 1/1997 | Rockwell, III |
| 5,751,008 A | 5/1998 | Jung et al. |
| 5,871,653 A | 2/1999 | Ling |
| 5,959,777 A | 9/1999 | Whitehead |
| 5,999,307 A | 12/1999 | Whitehead et al. |
| 6,064,784 A | 5/2000 | Whitehead et al. |
| 6,215,920 B1 | 4/2001 | Whitehead et al. |
| 6,304,365 B1 | 10/2001 | Whitehead et al. |
| 6,376,828 B1 | 4/2002 | Comiskey |
| 6,377,383 B1 | 4/2002 | Whitehead et al. |
| 6,384,979 B1 | 5/2002 | Whitehead et al. |
| 6,437,921 B1 | 8/2002 | Whitehead |
| 6,452,734 B1 | 9/2002 | Whitehead et al. |
| 6,574,025 B2 | 6/2003 | Whitehead et al. |
| 6,822,783 B2 | 11/2004 | Matsuda et al. |
| 6,842,279 B2 | 1/2005 | Amundson |
| 6,865,011 B2 | 3/2005 | Whitehead et al. |
| 6,885,496 B2 | 4/2005 | Whitehead et al. |
| 6,891,658 B2 | 5/2005 | Whitehead et al. |
| 7,046,439 B2 | 5/2006 | Kaminsky et al. |
| 7,093,968 B2 | 8/2006 | Hsueh et al. |
| 7,164,536 B2 | 1/2007 | Whitehead |
| 7,170,670 B2 | 1/2007 | Webber |
| 7,259,744 B2 | 8/2007 | Arango et al. |
| 7,286,280 B2 | 10/2007 | Whitehead et al. |
| 7,324,263 B2 | 1/2008 | Johnson et al. |
| 7,422,964 B2 | 9/2008 | Akiyama |
| 7,439,948 B2 | 10/2008 | Johnson et al. |
| 7,454,103 B2 | 11/2008 | Parriaux |
| 7,463,398 B2 | 12/2008 | Feenstra |
| 7,507,012 B2 | 3/2009 | Aylward et al. |
| 7,515,326 B2 | 4/2009 | Ibrede et al. |
| 7,564,614 B2 | 7/2009 | Chen et al. |
| 7,660,509 B2 | 2/2010 | Bryan et al. |
| 7,740,387 B2 | 6/2010 | Schultz et al. |
| 7,760,417 B2 | 7/2010 | Whitehead |
| 7,775,700 B2 | 8/2010 | Lee |
| 7,852,430 B1 | 12/2010 | Gettmey |
| 7,940,457 B2 | 5/2011 | Jain et al. |
| 8,022,615 B2 | 9/2011 | Bai et al. |
| 8,040,591 B2 | 10/2011 | Whitehead |
| 8,094,364 B2 | 1/2012 | Park |
| 8,179,034 B2 * | 5/2012 | Potts ...................... B82Y 20/00 313/504 |
| 8,384,659 B2 | 2/2013 | Yeo et al. |
| 8,587,512 B2 | 11/2013 | Hiji et al. |
| 8,690,408 B2 | 4/2014 | Li |
| 9,360,696 B1 | 6/2016 | Ghali et al. |
| 9,377,574 B2 | 6/2016 | Li |
| 2002/0089735 A1 | 7/2002 | Albert et al. |
| 2002/0171910 A1 | 11/2002 | Pullen et al. |
| 2003/0038755 A1 | 2/2003 | Amundson et al. |
| 2003/0067666 A1 | 4/2003 | Kawai |
| 2003/0165016 A1 | 9/2003 | Whitehead et al. |
| 2003/0214697 A1 | 11/2003 | Duthaler et al. |
| 2004/0136047 A1 | 7/2004 | Whitehead et al. |
| 2004/0174584 A1 | 9/2004 | Whitehead et al. |
| 2004/0239613 A1 | 12/2004 | Kishi |
| 2005/0007000 A1 | 1/2005 | Chou et al. |
| 2005/0270439 A1 | 12/2005 | Weber et al. |
| 2006/0056009 A1 | 3/2006 | Kombrekke et al. |
| 2006/0148262 A1 | 7/2006 | Lee et al. |
| 2006/0209418 A1 | 9/2006 | Whitehead |
| 2006/0291034 A1 | 12/2006 | Patry et al. |
| 2007/0008739 A1 | 1/2007 | Kim et al. |
| 2007/0019434 A1 | 1/2007 | Lee |
| 2007/0047003 A1 | 3/2007 | Suwabe |
| 2007/0091434 A1 | 4/2007 | Garner et al. |
| 2007/0263137 A1 | 11/2007 | Shigeta et al. |
| 2008/0174852 A1 | 7/2008 | Hirai et al. |
| 2008/0203910 A1 | 8/2008 | Reynolds |
| 2008/0204854 A1 | 8/2008 | Whitehead et al. |
| 2008/0219024 A1 | 9/2008 | Mi et al. |
| 2008/0231960 A1 | 9/2008 | Van Gorkom et al. |
| 2008/0266245 A1 * | 10/2008 | Wilcox .................. G02F 1/167 345/107 |
| 2008/0266646 A1 * | 10/2008 | Wilcox .................. G02F 1/167 359/296 |
| 2008/0285282 A1 | 11/2008 | Karman et al. |
| 2008/0297496 A1 | 12/2008 | Watson et al. |
| 2008/0303994 A1 | 12/2008 | Jeng et al. |
| 2008/0304134 A1 | 12/2008 | Ban |
| 2009/0109172 A1 | 4/2009 | Lee et al. |
| 2009/0201565 A1 | 8/2009 | Bita et al. |
| 2009/0201570 A1 | 8/2009 | Frazier et al. |
| 2009/0207476 A1 | 8/2009 | Yanagisawa et al. |
| 2009/0225398 A1 | 9/2009 | Duthaler et al. |
| 2009/0231714 A1 | 9/2009 | Zhao et al. |
| 2009/0262083 A1 | 10/2009 | Parekh |
| 2009/0262414 A1 | 10/2009 | Whitehead |
| 2009/0322669 A1 | 12/2009 | Bryning et al. |
| 2010/0079843 A1 | 4/2010 | Derichs et al. |
| 2010/0085627 A1 | 4/2010 | Whitehead |
| 2010/0091224 A1 | 4/2010 | Cho et al. |
| 2010/0118383 A1 | 5/2010 | Van Abeelen et al. |
| 2010/0148385 A1 | 6/2010 | Balko et al. |
| 2010/0172016 A1 | 7/2010 | Park et al. |
| 2010/0225575 A1 | 9/2010 | Ishii et al. |
| 2010/0253711 A1 | 10/2010 | Muroi |
| 2011/0043435 A1 | 2/2011 | Hebenstreit et al. |
| 2011/0085232 A1 | 4/2011 | Werner et al. |
| 2011/0273906 A1 | 10/2011 | Nichol et al. |
| 2011/0279442 A1 | 11/2011 | Hale et al. |
| 2011/0299014 A1 | 12/2011 | Jang et al. |
| 2011/0310465 A1 | 12/2011 | Takanashi |
| 2011/0316764 A1 | 12/2011 | Parry-Jones et al. |
| 2012/0008203 A1 | 1/2012 | Ijzerman et al. |
| 2012/0019896 A1 | 1/2012 | Yoshida et al. |
| 2012/0019899 A1 | 1/2012 | Yeo |
| 2012/0026576 A1 | 2/2012 | Bita et al. |
| 2012/0069064 A1 * | 3/2012 | Yamakita ................ G02F 1/167 345/690 |
| 2012/0081777 A1 | 4/2012 | Heikenfeld et al. |
| 2012/0113367 A1 | 5/2012 | Kitson et al. |
| 2012/0113499 A1 | 5/2012 | Komatsu |

(56) References Cited

U.S. PATENT DOCUMENTS

| | | |
|---|---|---|
| 2012/0262496 A1 | 10/2012 | Swic |
| 2012/0293857 A1 | 11/2012 | Kwon et al. |
| 2013/0135320 A1 | 5/2013 | Govil |
| 2013/0182311 A1 | 7/2013 | Mochizuki et al. |
| 2013/0278995 A1 | 10/2013 | Drzaic et al. |
| 2013/0334972 A1 | 12/2013 | Atkins |
| 2014/0333989 A1 | 11/2014 | Whitehead |
| 2014/0340376 A1 | 11/2014 | Itagaki et al. |
| 2015/0146273 A1 | 5/2015 | Whitehead |
| 2016/0097961 A1 | 4/2016 | Whitehead |
| 2016/0139478 A1 | 5/2016 | Whitehead |
| 2016/0147128 A1 | 5/2016 | Loxley et al. |

FOREIGN PATENT DOCUMENTS

| | | |
|---|---|---|
| CA | 2371138 C | 7/2005 |
| CA | 2410955 C | 1/2007 |
| CA | 2474384 C | 8/2010 |
| CA | 2643808 C | 8/2013 |
| CN | 1173208 C | 10/2004 |
| CN | 101160547 A | 4/2008 |
| CN | 1454327 A | 9/2008 |
| CN | 102955318 A | 3/2013 |
| DE | 69825894 | 9/2005 |
| EP | 1118039 | 2/2003 |
| EP | 0988573 B1 | 8/2004 |
| EP | 1290486 B1 | 10/2004 |
| EP | 1368700 B1 | 7/2006 |
| JP | 2004085635 | 3/2004 |
| JP | 2007505330 | 3/2007 |
| JP | 3965115 | 6/2007 |
| JP | 2007279641 | 10/2007 |
| JP | 4113843 | 4/2008 |
| JP | 2009251215 | 10/2009 |
| JP | 4956610 | 3/2012 |
| JP | 2005519329 | 6/2017 |
| KR | 100949412 | 3/2010 |
| WO | 2003075085 | 9/2003 |
| WO | 2005010604 | 2/2005 |
| WO | 2006108285 | 10/2006 |
| WO | 2006114743 | 11/2006 |
| WO | 2014146937 | 9/2014 |
| WO | 2015116913 | 8/2015 |
| WO | 2015175518 | 11/2015 |
| WO | 2016130720 | 8/2016 |

OTHER PUBLICATIONS

International Search Report and Written Opinion dated Dec. 30, 2014 for PCT Application No. PCT/US2014/058118.
International Search Report and Written Opinion dated Aug. 11, 2014 for PCT Application No. PCT/US2014/030966.
International Search Report and Written Opinion dated Sep. 19, 2014 for PCT Application No. PCT/US2014/038091.
International Search Report and Written Opinion dated Oct. 1, 2015 for PCT Application No. PCT/US2015/030349.
International Search Report and Written Opinion dated Apr. 3, 2015 for PCT Application No. PCT/US2014/061911.
International Search Report and Written Opinion dated Apr. 13, 2016 for PCT Application No. PCT/US2015/066980.
International Search Report and Written Opinion dated Apr. 21, 2016 for PCT Application No. PCT/US2016/017416.
International Search Report and Written Opinion dated Mar. 1, 2016 for PCT Application No. PCT/US2015/013725.
nternational Search Report and Written Opinion dated Jan. 27, 2016 for PCT Application No. PCT/US2015/054385.
International Search Report and Written Opinion dated Mar. 2, 2016 for PCT Application No. PCT/US2015/062075.
Mossman, M. A. et al., "A Novel Reflective Image Display Using Total Internal Reflection" Displays Devices, Dempa Publications, Tokyo JP vol. 25, No. 5 Dec. 1, 2004 pp. 215-221.
International Search Report and Written Opinion dated Mar. 28, 2016 for PCT Application No. PCT/US2015/0066150.
Gou, S. et al., "Transparent Superhydrophobic Surfaces for Applications of Controlled Reflectance" Applied Optics vol. 51, Issue No. 11, Apr. 10, 2012, pp. 1645-1653.
Whitehead, L. et al., "The Many Roles of Illumination in Information Display" Society for Information Display Symposium (Invited Paper), Issue No. 0097-966X/06/3701-0000, May 2010.
Wong, R. et al., "Electrochemical Threshold Conditions During Electro-Optical Switching of Ionic Electrophorectic Optical Devices" Applied Optics vol. 48, Issue No. 6, Feb. 20, 2009, pp. 1062-1072.
Whitehead, L. et al., "Reflections on Total Internal Reflection" Optics and Photonics News Feb. 2009, pp. 28-34.
Mossman, M. et al., "Observations of Total Internal Reflection at a Natural Super-Hydrophobic Surface" Physics in Canada vol. 64, Issue No. 1, Mar. 2008, pp. 7-11.
Hrudey, P. et al., "Application of Transparent Nanostructured Electrodes for Modulation of Total Internal Reflection" SPIE 2007 Conference Paper No. 6647 Aug. 2007, pp. 1-12.
Hrudey, P. et al., "Variable Diffraction Gratings Using Nanoporous Electrodes and Electrophoresis of Dye Ions" SPIE 2007 Conference Paper No. 6645 Aug. 2007, pp. 1-12.
Webster, A. et al., "Control of Reflection at an Optical Interface in the Absence of Total Internal Reflection for a Retroreflective Display Application" Applied Optics vol. 45, Issue No. 6, Feb. 20, 2006, pp. 1169-1176.
Mossman, M. et al., "Off the Beaten Path with Total Internal Reflection" International Optical Design Conference (Invited Paper), Jun. 2006, pp. 1-12.
Whitehead, L. et al., "Total Internal Reflection for Illumination and Displays" SPIE Newsroom Sep. 7-8, 2006.
Mossman, M. et al., "Controlled Frustration of TIR by Electrophoresis of Pigment Particles" Applied Optics vol. 14, Issue No. 9, Mar. 20, 2005, pp. 1601-1609.
Kwong, V. et al., "Control of Reflectance of Liquid Droplets by Means of Electrowetting" Applied Optics vol. 43, Issue No. 4, Feb. 1, 2004, pp. 808-813.
Mossman, M. et al. "A High Reflectance, Wide Viewing Angle Reflective Display Using Total Internal Reflection in Mirco-Hemispheres" International Display Research Conference, Issue No. 1083-1312/00/2003-0233, Sep. 2003, pp. 233-236.
Mossman, M. et al., "Grey Scale Control of Total Internal Reflection Using Electrophoresis of Sub-Optical Pigment Particles" International Conference of the Society for Information Display, Boston, MA Issue No. 2-0966X/02/3301-0522, May 2002, pp. 522-525.
Coope, R. et al., "Modulation of Retroreflection by Controlled Frustration of Total Internal Reflection" Applied Optics vol. 41, Issue No. 25, Sep. 1, 2002, pp. 5357-5361.
Mossman, M. et al., "New Method for Maintaining Long Term Image Quality in a TIR Based Electrophoretic Display" International Display Research Conference, Nice, France, EURODISPLAY Oct. 2002, pp. 851-854.
Mossman, M. et al., "New Reflective Color Display Technique Based on Total Internal Reflection and Subtractive color Filtering" International Conference of the Society for Information Display, San Jose, CA Issue No. 1-0966X/01/3201-1054, Jun. 2001, pp. 1054-1057.
Whitehead, L. et al., "Visual Applications of Total Internal Reflection in Prismatic Microstructures" Physics in Canada Nov./Dec. 2001, pp. 329-335.
Mossman, M. et al., "A New Reflective Display Based on Total Internal Reflection in Prismatic Microstructures" Proceedings of the 2000 Society for Information Display, International Display Research Conference, Issue No. 1083-1312/00/2001-0311, Oct. 2000, pp. 311-314.
Mossman et al. "Brightness Enhancement in TIR-Modulated Electrophoretic Reflective Image Displays", (Biblio).
Atsuhito et al. "Electrophoresis Device, Method of Manufacturing the Electrophoresis Device, Display, Display Substrate, and Electronic Unit", (Abstract).

* cited by examiner

DISPLACED POROUS ELECTRODE FOR FRUSTRATING TIR AND RETURNING LIGHT THROUGH EXIT PUPIL

RELATED APPLICATIONS

This application claims priority to the filing date of PCT Application Serial No. PCT/US14/30966 (filed Mar. 18, 2014), which claims priority to Provisional Patent Application 61/805,391 filed on Mar. 26, 2013.

TECHNICAL FIELD

This disclosure pertains to attainment of high brightness in wide viewing angle reflective image displays of the type described in U.S. Pat. Nos. 5,999,307; 6,064,784; 6,215,920; 6,865,011; 6,885,496; 6,891,658; 7,164,536; 7,286,280 and 8,040,591; all of which are incorporated herein by reference.

BACKGROUND

FIG. 1A depicts a portion of a prior art reflective (i.e. front-lit) electrophoretically frustrated total internal reflection (TIR) modulated display 10 of the type described in U.S. Pat. Nos. 6,885,496; 6,891,658; 7,164,536 and 8,040,591. Display 10 includes a transparent outward sheet 12 formed by partially embedding a large plurality of high refractive index (e.g. $\eta_1 \gtrsim \sim 1.90$) transparent spherical or approximately spherical beads 14 in the inward surface of a high refractive index (e.g. $\eta_1 \gtrsim \sim 1.75$) polymeric material 16 having a flat outward viewing surface 17 which viewer V observes through an angular range of viewing directions Y. The "inward" and "outward" directions are indicated by double-headed arrow Z. Beads 14 are packed closely together to form an inwardly projecting monolayer 18 having a thickness approximately equal to the diameter of one of beads 14. Ideally, each one of beads 14 touches all of the beads immediately adjacent to that one bead. Minimal interstitial gaps (ideally, no gaps) remain between adjacent beads.

An electrophoresis medium 20 is maintained adjacent the portions of beads 14 which protrude inwardly from material 16 by containment of medium 20 within a reservoir 22 defined by lower sheet 24. An inert, low refractive index (i.e. less than about 1.35), low viscosity, electrically insulating liquid such as Fluorinert™ perfluorinated hydrocarbon liquid ($\eta_1 \sim 1.27$) available from 3M, St. Paul, Minn. is a suitable electrophoresis medium. Other liquids, or water can also be used as electrophoresis medium 20. A bead:liquid TIR interface is thus formed. Medium 20 contains a finely dispersed suspension of light scattering and/or absorptive particles 26 such as pigments, dyed or otherwise scattering/absorptive silica or latex particles, etc. Sheet 24's optical characteristics are relatively unimportant: sheet 24 need only form a reservoir for containment of electrophoresis medium 20 and particles 26, and serve as a support for backplane electrode 48.

As is well known, the TIR interface between two media having different refractive indices is characterized by a critical angle $\theta_c$. Light rays incident upon the interface at angles less than $\theta_c$ are transmitted through the interface. Light rays incident upon the interface at angles greater than $\theta_c$ undergo TIR at the interface. A small critical angle is preferred at the TIR interface since this affords a large range of angles over which TIR may occur.

In the absence of electrophoretic activity, as is illustrated to the right of dashed line 28 in FIG. 1A, a substantial fraction of the light rays passing through sheet 12 and beads 14 undergoes TIR at the inward side of beads 14. For example, incident light rays 30, 32 are refracted through material 16 and beads 14. The rays undergo TIR two or more times at the bead:liquid TIR interface, as indicated at points 34, 36 in the case of ray 30; and indicated at points 38, 40 in the case of ray 32. The totally internally reflected rays are then refracted back through beads 14 and material 16 and emerge as rays 42, 44 respectively, achieving a "white" appearance in each reflection region or pixel.

A voltage can be applied across medium 20 via electrodes 46 and 48 which can for example be applied by vapour-deposition to the inwardly protruding surface portion of beads 14 and to the outward surface of sheet 24. Electrode 46 is transparent and substantially thin to minimize its interference with light rays at the bead:liquid TIR interface. Backplane electrode 48 need not be transparent. If electrophoresis medium 20 is activated by actuating voltage source 50 to apply a voltage between electrodes 46 and 48 as illustrated to the left of dashed line 28, suspended particles 26 are electrophoretically moved adjacent the surface of the monolayer of beads 18 into the region where the evanescent wave is relatively intense (i.e. within 0.25 micron of the inward surfaces of inwardly protruding beads 14, or closer). When electrophoretically moved as aforesaid, particles 26 scatter or absorb light, thus frustrating or modulating TIR by modifying the imaginary and possibly the real component of the effective refractive index at the bead:liquid TIR interface. This is illustrated by light rays 52 and 54 which are scattered and/or absorbed as they strike particles 26 inside the thin (~0.5 µm) evanescent wave region at the bead:liquid TIR interface, as indicated at 56 and 58 respectively, thus achieving a "dark" appearance in each TIR-frustrated non-reflective absorption region or pixel. Particles 26 need only be moved outside the thin evanescent wave region, by suitably actuating voltage source 50, in order to restore the TIR capability of the bead:liquid TIR interface and convert each "dark" non-reflective absorption region or pixel to a "white" reflection region or pixel.

As described above, the net optical characteristics of outward sheet 12 can be controlled by controlling the voltage applied across medium 20 via electrodes 46 and 48. The electrodes can be segmented to control the electrophoretic activation of medium 20 across separate regions or pixels of sheet 12, thus forming an image.

FIG. 2 depicts, in enlarged cross-section, an inward hemispherical or "hemi-bead" portion 60 of one of spherical beads 14. Hemi-bead 60 has a normalized radius r=1 and a refractive index $\eta_1$. A light ray 62 perpendicularly incident (through material 16) on hemi-bead 60 at a radial distance a from hemi-bead 60's center C encounters the inward surface of hemi-bead 60 at an angle $\theta_1$ relative to radial axis 66. For purposes of this theoretically ideal discussion, it is assumed that material 16 has the same refractive index as hemi-bead 60 (i.e. $\eta_1 = \eta_2$), so ray 62 passes from material 16 into hemi-bead 60 without refraction. Ray 62 is refracted at the inward surface of hemi-bead 60 and passes into electrophoretic medium 20 as ray 64 at an angle $\theta_2$ relative to radial axis 66.

Now consider incident light ray 68 which is perpendicularly incident (through material 16) on hemi-bead 60 at a distance $$a_c = \frac{\eta_3}{\eta_1}$$

from hemi-bead 60's center C. Ray 68 encounters the inward surface of hemi-bead 60 at the critical angle $\theta_c$ (relative to radial axis 70), the minimum required angle for TIR to occur. Ray 68 is accordingly totally internally reflected, as ray 72, which again encounters the inward surface of hemi-bead 60 at the critical angle $\theta_c$. Ray 72 is accordingly totally internally reflected, as ray 74, which also encounters the inward surface of hemi-bead 60 at the critical angle $\theta_c$. Ray 74 is accordingly totally internally reflected, as ray 76, which passes perpendicularly through hemi-bead 60 into the embedded portion of bead 14 and into material 16. Ray 68 is thus reflected back as ray 76 in a direction approximately opposite that of incident ray 68.

All light rays which are incident on hemi-bead 60 at distances $a \geq a_c$ from hemi-bead 60's center C are reflected back (but not exactly retro-reflected) toward the light source; which means that the reflection is enhanced when the light source is overhead and slightly behind the viewer, and that the reflected light has a diffuse characteristic giving it a white appearance, which is desirable in reflective display applications. FIGS. 3A, 3B and 3C depict three of hemi-bead 60's reflection modes. These and other modes coexist, but it is useful to discuss each mode separately.

In FIG. 3A, light rays incident within a range of distances $a_c < a \leq a_1$ undergo TIR twice (the 2-TIR mode) and the reflected rays diverge within a comparatively wide arc $\varphi_1$ centered on a direction opposite to the direction of the incident light rays. In FIG. 3B, light rays incident within a range of distances $a_1 < a \leq a_2$ undergo TIR three times (the 3-TIR mode) and the reflected rays diverge within a narrower arc $\varphi_2 < \varphi_1$ which is again centered on a direction opposite to the direction of the incident light rays. In FIG. 3C, light rays incident within a range of distances $a_2 < a \leq a_3$ undergo TIR four times (the 4-TIR mode) and the reflected rays diverge within a still narrower arc $\varphi_3 < \varphi_2$ also centered on a direction opposite to the direction of the incident light rays. Hemi-bead 60 thus has a "semi-retro-reflective," partially diffuse reflection characteristic, causing display 10 to have a diffuse appearance akin to that of paper.

Display 10 has relatively high apparent brightness, comparable to that of paper, when the dominant source of illumination is behind the viewer, within a small angular range. This is illustrated in FIG. 1B which depicts the wide angular range a over which viewer V is able to view display 10, and the angle β which is the angular deviation of illumination source S relative to the location of viewer V. Display 10's high apparent brightness is maintained as long as β is not too large. At normal incidence, the reflectance R of hemi-bead 60 (i.e. the fraction of light rays incident on hemi-bead 60 that reflect by TIR) is given by equation (1):

$$R = 1 - \left(\frac{\eta_3}{\eta_1}\right)^2 \quad (1)$$

where $\eta_1$ is the refractive index of hemi-bead 60 and $\eta_3$ is the refractive index of the medium adjacent the surface of hemi-bead 60 at which TIR occurs. Thus, if hemi-bead 60 is formed of a lower refractive index material such as polycarbonate ($\eta_1 \sim 1.59$) and if the adjacent medium is Fluorinert ($\eta_3 \sim 1.27$), a reflectance R of about 36% is attained, whereas if hemi-bead 60 is formed of a high refractive index nanocomposite material ($\eta_1 \sim 1.92$) a reflectance R of about 56% is attained. When illumination source S (FIG. 1B) is positioned behind viewer V's head, the apparent brightness of display 10 is further enhanced by the aforementioned semi-retro-reflective characteristic.

As shown in FIGS. 4A-4G, hemi-bead 60's reflectance is maintained over a broad range of incidence angles, thus enhancing display 10's wide angular viewing characteristic and its apparent brightness. For example, FIG. 4A shows hemi-bead 60 as seen from perpendicular incidence—that is, from an incidence angle offset 0° from the perpendicular. In this case, the portion 80 of hemi-bead 60 for which $a \geq a_c$ appears as an annulus. The annulus is depicted as white, corresponding to the fact that this is the region of hemi-bead 60 which reflects incident light rays by TIR, as aforesaid. The annulus surrounds a circular region 82 which is depicted as dark, corresponding to the fact that this is the non-reflective region of hemi-bead 60 within which incident rays are absorbed and do not undergo TIR. FIGS. 4B-4G show hemi-bead 60 as seen from incident angles which are respectively offset 15°, 30°, 45°, 60°, 75° and 90° from the perpendicular. Comparison of FIGS. 4B-4G with FIG. 4A reveals that the observed area of reflective portion 80 of hemi-bead 60 for which $a \geq a_c$ decreases only gradually as the incidence angle increases. Even at near glancing incidence angles (e.g. FIG. 4F) an observer will still see a substantial part of reflective portion 80, thus giving display 10 a wide angular viewing range over which high apparent brightness is maintained.

The reflective, white annular region 80 surrounding the non-reflective, dark circular region 82 presents a problem commonly referred to as the "dark pupil" problem which reduces the reflectance of the display. The display's performance is further reduced by transparent electrode 46, which may be formed by provision of a transparent conductive coating on hemi-beads 14. Such coatings typically absorb about 5% to 10% of the incident light. Since a light ray typically reflects several times, this can make it difficult to achieve efficient reflection. A further related problem is that it can be expensive and challenging to apply such a coating to a contoured hemispherical surface.

The dark pupil problem can be addressed by reflecting back toward hemi-beads 14 (i.e. "recycling") light rays which pass through the non-reflective, dark circular region 82 of any of hemi-beads 14. An approach to solving this problem and enhancing the brightness of the display is to equip the display with a reflective component to reflect the light back through the pupil and towards the viewer. FIG. 5 depicts a prior art reflective (i.e. front-lit) frustrated total internal reflection (TIR) modulated display 100 of the type described in PCT Application No. WO 2006/108285 A1 and South Korean patent No. 10-2007-7026347. Display 100 includes a transparent outer sheet 102 formed by partially embedding a large plurality of high refractive index transparent spherical or approximately spherical beads 104 in the inward surface of a high refractive index polymeric material 102 having a flat outward viewing surface 106 by which a viewer views the display image. On the surface of the plurality of spherical beads 104 is a substantially transparent electrode 107.

An electrophoresis medium 108 is contained within the reservoir or cavity formed between the portions of beads 104 which protrude inwardly from material 102 and the lower or rear sheet 110. On the inward surface of the rear sheet 110 is an electrode layer 111. The medium 108 is an inert, low refractive index, low viscosity liquid such as a fluorinated hydrocarbon. Other liquids may also be used as electrophoresis medium 108. A bead:liquid TIR interface is thus formed. Medium 108 further contains a finely dispersed suspension of light absorbing, electrophoretically mobile particles 112.

FIG. 5 further depicts a prior art reflective, continuous, porous, membrane 118 disposed between the inward surfaces of hemisphere beads 116 and rear sheet 110 to enhance the brightness of the TIR display. The average diameter of the pores in the continuous membrane 118 is substantially greater (e.g. about 10 times greater) than the average diameter of absorptive particles 112. The pores in membrane 118 constitute a sufficiently large fraction (e.g. at least 20%) of the total surface area of membrane 118 to substantially permit unimpeded passage of absorptive particles 112 through membrane 118. Membrane 118's outward surface 120 is highly reflective, and may be either diffusely or specularly reflective.

In the absence of electrophoretic activity, as is illustrated to the left of dashed line 114 in FIG. 5 prior art, the smaller absorptive particles 112 tend to settle through membrane 140's pores, toward the rear electrode layer 111 on rear sheet 110 or if the electrophoretic particles are driven to the rear electrode 111 under the influence of an applied electric field. Reflectance is thus increased and enhanced, since incident light rays (e.g. ray 122) which would otherwise have passed through the "dark pupil" region of the hemisphere beads 116 and would have been absorbed by, such as, the absorptive particles 112 located at the lower sheet 110, are instead reflected (e.g. ray 124) by membrane 118's reflective outward surface 120. Light rays (e.g. ray 126) which are incident upon reflective annular regions of the hemisphere beads are totally internally reflected (e.g. ray 128).

When a voltage is applied across medium 108, as is illustrated to the right of dashed line 114 in the prior art depicted in FIG. 5, absorptive particles 112 are electrophoretically moved through membrane 118's pores and attracted to electrode layer 107 on the inward surfaces of hemisphere beads 116. When so moved into this absorptive state, particles 112 absorb light rays (e.g. ray 130) which are incident upon the annular regions of the hemisphere beads by frustrating or modulating TIR, and also absorb light rays (e.g. rays 132) which do not undergo TIR and which would otherwise pass through beads 104. Membrane 118's pores allow absorptive particles 112 to move outwardly into contact with the surface of hemisphere beads 116 in the absorptive state; and to move inwardly away from hemisphere beads 116 in the reflective state, thus obscuring absorptive particles 112 from direct view in the reflective state.

As described in the preceding paragraphs, the porous reflective membrane's purpose is to reflect the light that passes through the dark pupil of the hemi-beads 116 back through the pupil region of the hemi-beads 116 and towards the viewer to enhance the brightness of the display as depicted in FIG. 5. An alternative porous reflective membrane structure is disclosed herein. This disclosure pertains to a TIR-based display comprising of a frustratable (i.e. the degree to which the incident light undergoes total internal reflection can be controllably modified by altering the optical properties, and specifically the refractive index values, at or near the interface at which the light undergoes TIR), optically transparent, hemispherically-contoured front sheet and a multi-functional porous continuous reflective membrane. A hemispherically-contoured front sheet is a substantially flat sheet that has a plurality of protruding surface features, said surface features having a substantially hemispherical shape. Herein, a porous continuous membrane is further comprised of a top electrically conductive metal layer that faces the hemispherical contoured surface of the optically transparent front sheet. The top metal layer is porous and continuous and acts as both a light reflector to enhance the brightness of the display and as the top electrode layer. This new structure disclosed herein simplifies manufacturing of TIR-based displays described herein and greatly lowers manufacturing costs. Additionally, by removing the mostly transparent electrode layer from the surface of the hemispherical beads as shown in the prior art display in FIG. 5, less light will be lost due to absorption by the electrode layer thus further increasing the brightness of the display. ITO can degrade over time under various conditions such as exposure to high voltages, temperatures and contact with the electrophoretic medium. As ITO degrades it becomes less transparent and further absorbs light leading to a further decrease in brightness of the display. Furthermore, removing the ITO layer and replacing with a metal layer as the top electrode reduces the resistance leading to increased switching uniformity.

The foregoing examples of the related art and limitations related thereto are intended to be illustrative and not exclusive. Other limitations of the related art will become apparent to those of skill in the art upon a reading of the specification and a study of the drawings.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIGS. 6A and 6B respectively depict the display pixel's light reflecting and light absorbing (i.e. non-reflective) states.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figures 1A, 1B:
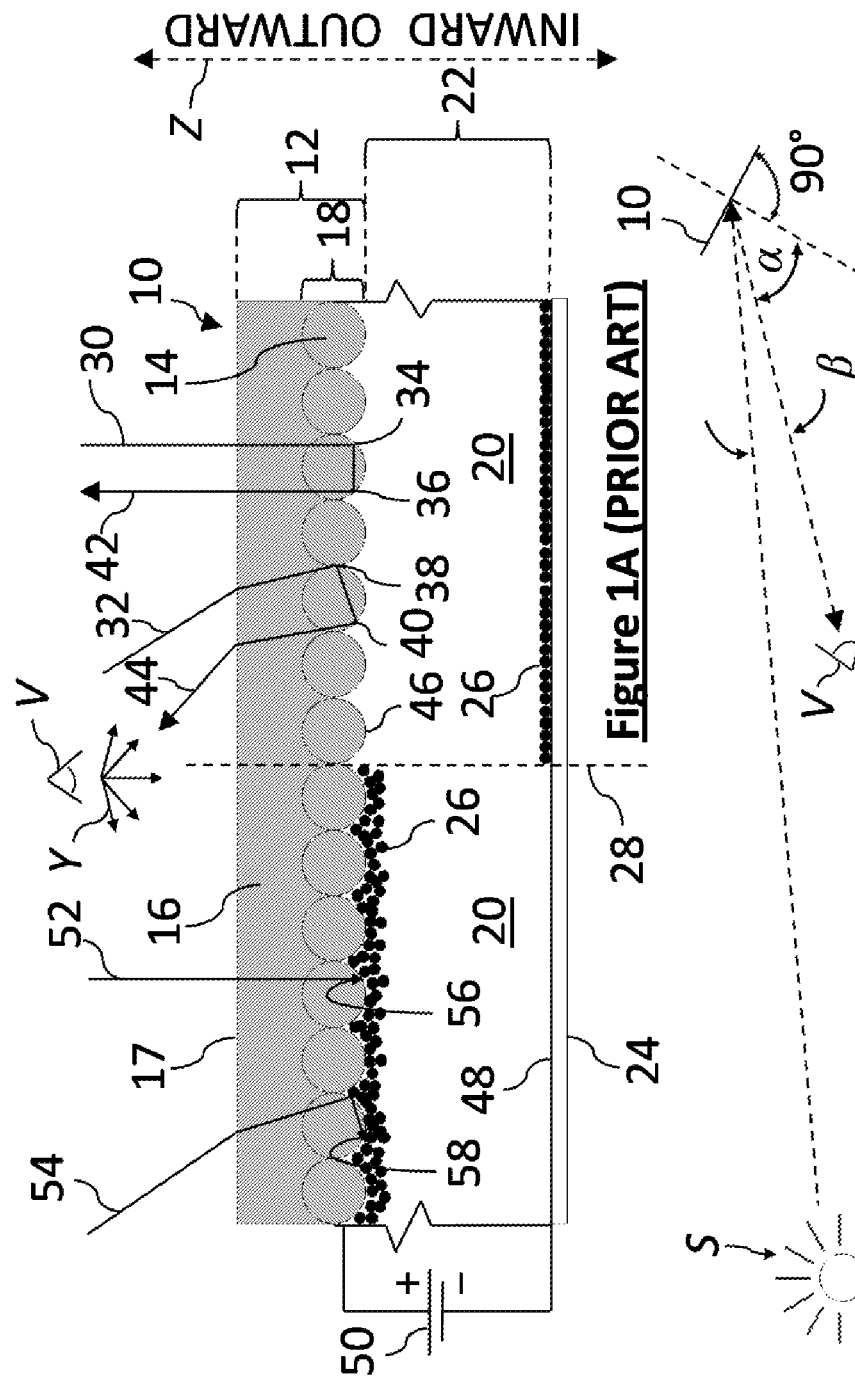
FIG. 1A is a greatly enlarged, not to scale, fragmented cross-sectional side elevation view, of a portion of an electrophoretically frustrated or modulated prior art reflective image display.
FIG. 1B schematically illustrates the wide angle viewing range a of the FIG. 1A display, and the angular range β of the illumination source.
Figure 2:
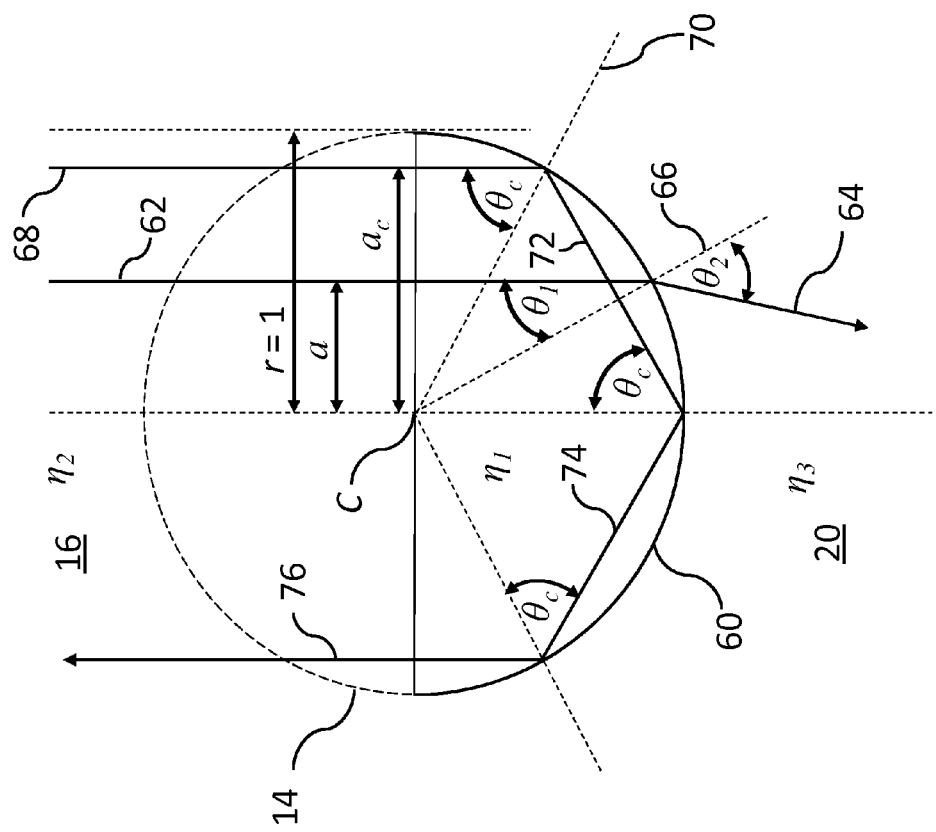
FIG. 2 is a greatly enlarged, cross-sectional side elevation view of a hemispherical ("hemi-bead") portion of one of the spherical beads of the FIG. 1A apparatus.
Figure 3:
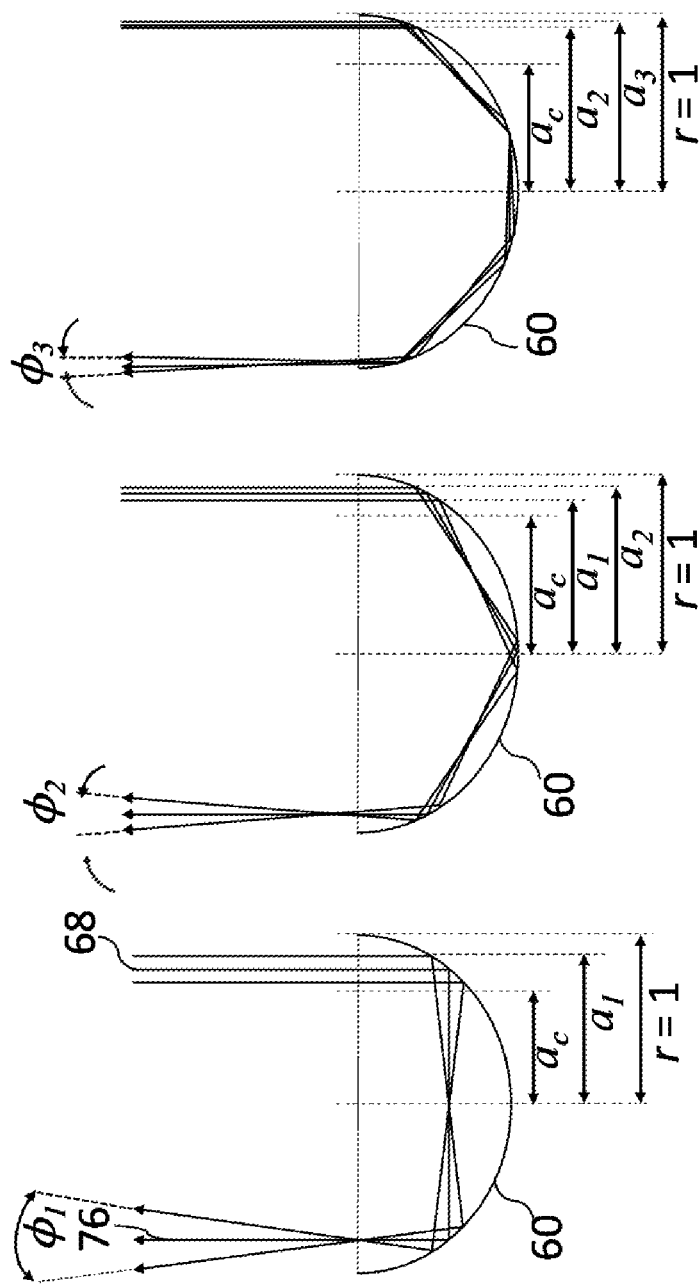
FIGS. 3A, 3B and 3C depict semi-retro-reflection of light rays perpendicularly incident on the FIG. 2 hemi-bead at increasing off-axis distances at which the incident rays undergo TIR two, three and four times respectively.
Figure 4:
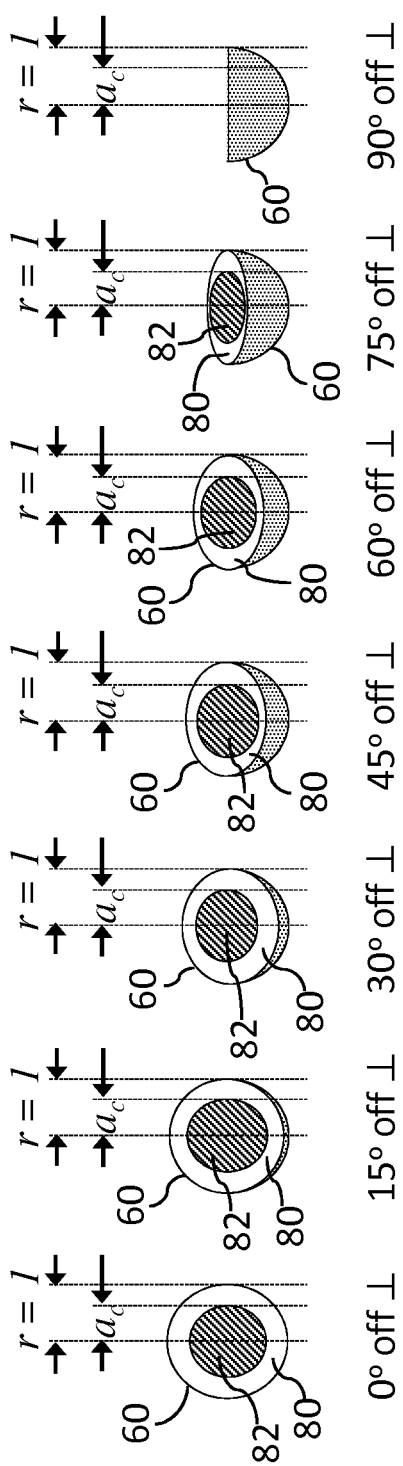
FIGS. 4A, 4B, 4C, 4D, 4E, 4F and 4G depict the FIG. 2 hemi-bead, as seen from viewing angles which are offset 0°, 15°, 30°, 45°, 60°, 75° and 90°, respectively, from the perpendicular.
Figure 6:
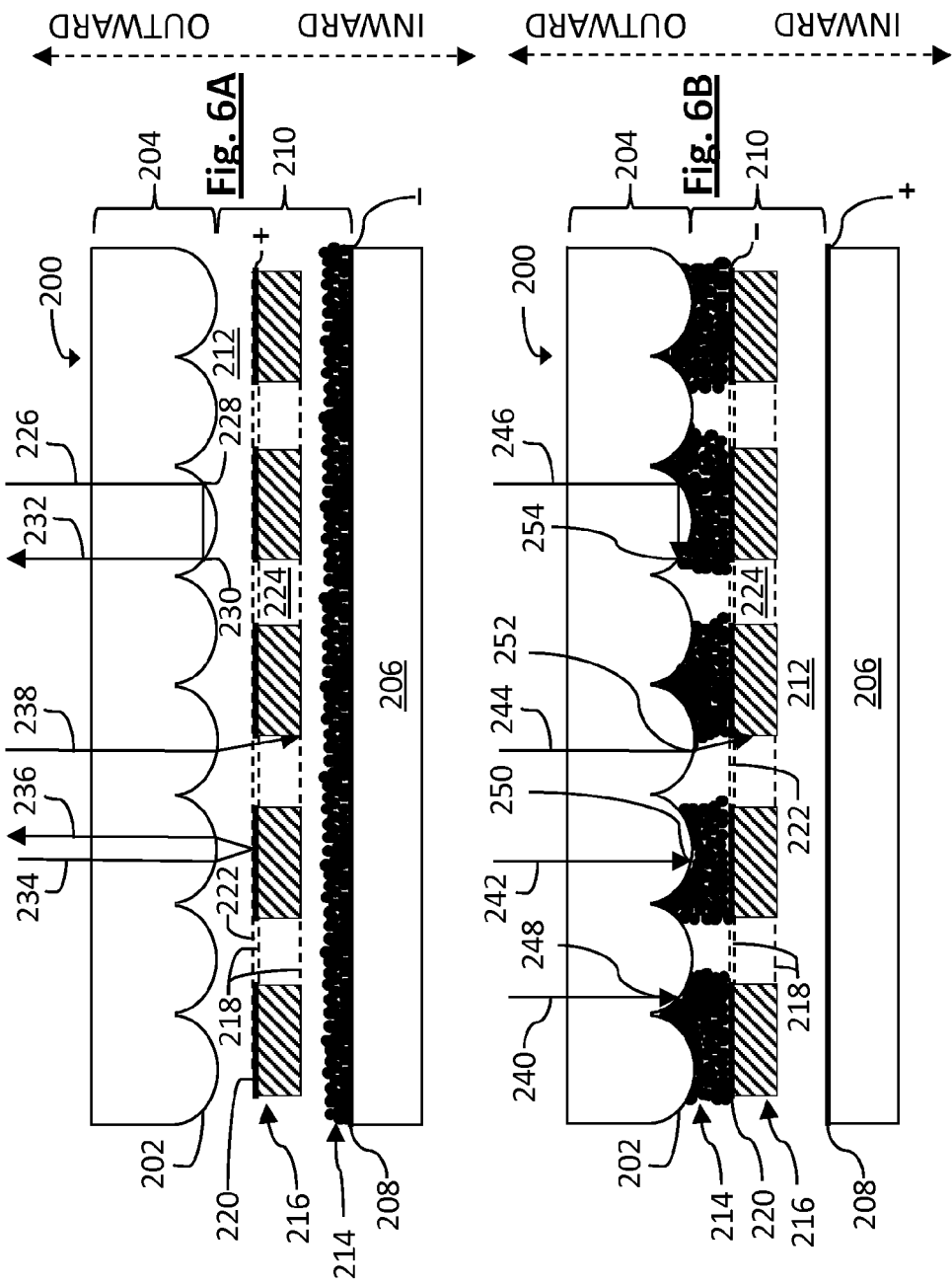
FIGS. 6A and 6B are greatly enlarged, not to scale, fragmented cross-sectional side elevation views of a single pixel portion of an electrophoretically frustrated (i.e. modulated) reflective image display comprising of an insulating porous continuous membrane with a top porous reflective electrically conductive continuous metal layer acting as the front electrode layer located between the front hemispherical surface and the rear electrode.

FIGS. 6A and 6B depict a display 200 comprising of a hemispherically-contoured surface 202 formed integrally with display 200's transparent outward sheet 204. In contrast, display 10's hemi-spherical surface is formed by a closely packed layer of discrete beads 14 partially embedded in sheet 12 as shown in FIG. 1A. Either hemispherical or related surface structure depicted in displays 10 and 200 can be used in combination with the inventions described herein. It should be noted that the hemispherically-contoured front sheet which comprises of a plurality of hemispherical shaped protrusions may be fabricated by various methods such, but not limited to, embossing, etching, molding, self-assembly, printing, lithography or micro-replication. Display 200 is further comprised of a rear backplane support 206 and rear backplane electrode layer 208. The rear electrode 208 may be comprised of a patterned or segmented array or a conventional thin film transistor (TFT) array or a combination thereof. Within the cavity or reservoir 210 defined by the hemispherically-contoured surface 202 and the rear electrode layer 208 is a liquid medium 212 comprising of suspended electrophoretically mobile and light absorbing particles 214. The particles 214 may be comprised of an organic material or an inorganic material or a combination of organic and inorganic materials. Electrophoretic particles 214 may be moved through the liquid medium 212 by application of an electric field. The liquid medium 212 may be, for example, an inert, low refractive index (i.e. less than about 1.35), low viscosity, electrically insulating liquid such as Fluorinert™ perfluorinated hydrocarbon liquid ($\eta_1$~1.27) available from 3M, St. Paul, Minn. is a suitable electrophoresis medium. Other liquids, such as hydrocarbons or water can also be used as electrophoresis medium 212.

Display 200 depicted in FIGS. 6A and 6B further comprises of a porous continuous membrane 216 situated between hemispherical surface 202 and backplane electrode 208. Dotted lines 218 represent the continuous nature of the porous membrane 216. Membrane 216 may be formed of a variety of materials such as, but not limited to, glass or a polymeric material such Teflon®, Mylar®, polyethylene terephthalate, polyimide or polycarbonate. Membrane 216 has a thickness of at least about 5 to about 40 microns. More preferably, membrane 216 has a thickness of about 10 to about 20 microns.

Figure 5:
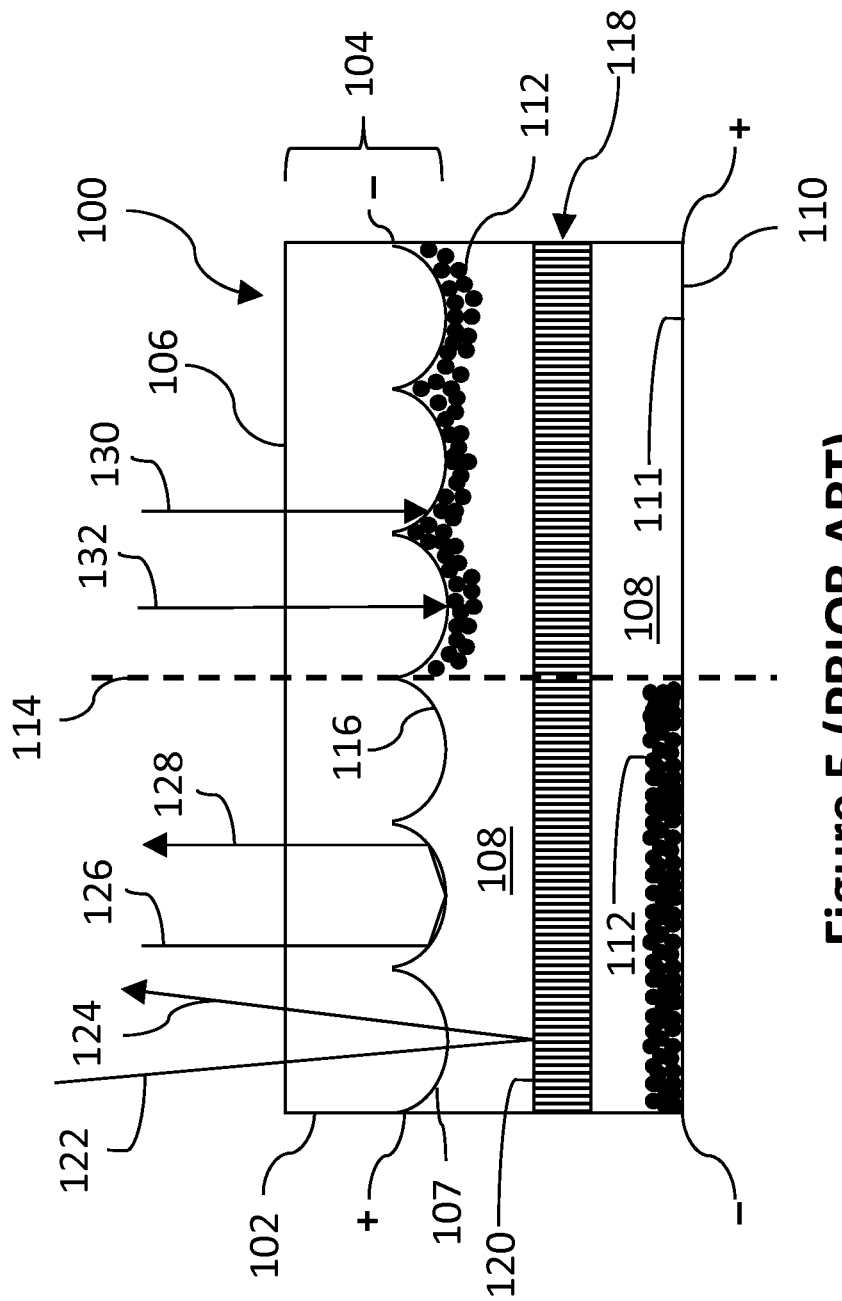
FIG. 5 is a greatly enlarged, not to scale, fragmented cross-sectional side elevation view, of a portion of an electrophoretically frustrated or modulated prior art reflective image display equipped with a reflective porous continuous membrane and a transparent front electrode layer on the hemispherical surface.

As depicted in FIGS. 6A and 6B, membrane 216 further comprises a top porous continuous reflective metal layer 220 on the outward side of membrane 216 (facing hemi-spherically-contoured surface 202). Dotted lines 222 represent the continuous nature of the porous metal layer 220. The metal layer may be comprised of, but not limited to, aluminum, gold, silver or combinations thereof. Metal layer 220 may be formed on membrane 216 by coating membrane 216's outward surface with a reflective conductive material such as, but not limited to, electron beam evaporated, vacuum deposited or sputter coated thin metal film that serves as the common (ground) electrode of display 200. This metal layer 220 has a thickness of at least about 0.040 microns to about 0.20 microns. More preferably it has a thickness of about 0.10 microns to about 0.20 microns. The combined membrane:metal layer structure is porous and continuous and has a thickness of at least about 5 to about 40 microns, more preferably a thickness of at least about 10 to about 21 microns. Metal layer 220 acts both as an electrode and a light reflector. This is in contrast to display 100 in FIG. 5 where the membrane is inert and acts only as a light reflector while the front electrode 107 is instead located on the surface of hemispherical beads 116. By preferentially having a porous metal layer 220 on the porous membrane 216 instead of on the hemispherically-contoured surface 202 greatly simplifies the manufacturing process and reduces manufacturing costs of the display. It is more difficult and costly to deposit a uniform conductive layer on the contoured hemispherical surface 202. Additionally, having the conductive layer (i.e. front electrode) on contoured hemispherical surface 202 further requires the layer to be transparent to allow for light to pass through contoured hemispherical surface 202 to be absorbed by the electrophoretically mobile particles 214 to frustrate TIR and create a dark state. For example, ITO is a common transparent conductive material and the most likely candidate for the transparent conducting layer but is typically more expensive than, for example, aluminum. Additionally, ITO is not completely transparent as some light is absorbed (estimated to be about 5% to about 10%) thus lowering the overall reflectance and brightness of the display. Another advantage of using aluminum as the conductive layer is that it has a wider process window. If the thickness of the ITO layer is increased the resulting reflectance decreases, but if the thickness of the ITO layer is decreased enough then there is a possible risk of a loss of electrical contact between the hemispheres. The coating of ITO is directional such that when ITO is deposited on the horizontal surface of the hemispherical beads it tends to be thicker than when ITO is deposited on the vertical surfaces of the beads leading to discontinuity in the coating just above the hemisphere equator where the ITO is very thin or even non-existent. A loss of or greatly diminished electrical contact between the hemispheres reduces the capacitance of the electrode leading to detrimental effects like slower switching times. An electrode made out of aluminum, for example, has a wider process window as the thickness can vary by a factor of two without much impact on the performance.

As mentioned in the preceding paragraphs, the metal:membrane structure is porous, enabling light absorbing electrophoretically mobile particles 214 to readily move through apertures 224 that penetrate both the membrane 216 and metal layer 220, as display 200's pixels are selectively switched between the light reflecting state (FIG. 6A) and the light absorbing or dark state (FIG. 6B). An electrophoresis medium 212 comprising of electrophoretically mobile particles 214 is maintained adjacent hemi-spherical surface 202 by containment of medium 212 within reservoir 210 defined by hemi-spherical surface 202 and backplane electrode layer 208. The apertures 224 in the metal:membrane structure have diameters of at least about 5 microns. The apertures 224 have diameters in the range of at least about 5 microns to about 20 microns. More preferably, the apertures 224 have diameters in the range of about 10 microns to about 15 microns. The apertures 224 in the metal:membrane structure may be ordered in substantially regular arrays or aligned in a substantially random or irregular array or any combination thereof. The micron centers (i.e. the center point of each aperture) of the apertures 224 are spaced at least about 10 microns apart. More preferably apertures 224 are spaced about 25 microns to about 35 microns apart.

Figure 7:
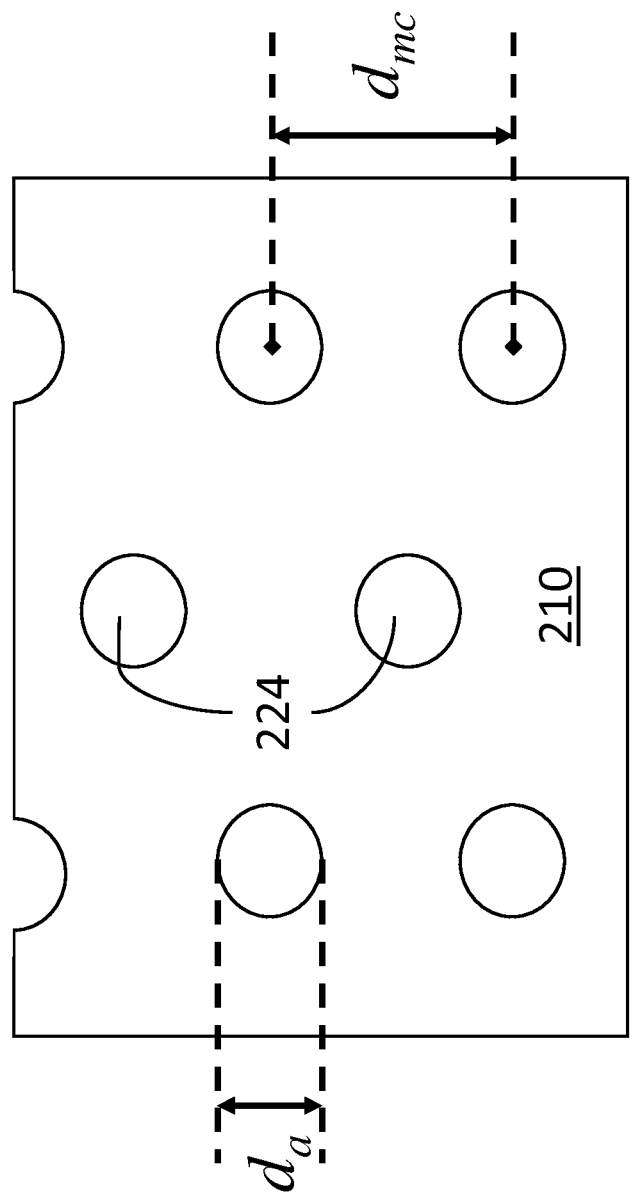
FIG. 7 is a greatly enlarged, not to scale, overhead view of a portion of a porous continuous membrane with a top reflective continuous and electrically conductive metal layer.

FIG. 7 further illustrates the various aspects that must be considered in the design of the membrane:metal layer structure. FIG. 7 is an overhead view of a portion of the apertured continuous membrane:metal layer structure. In this view looking down on the top of the reflective metal layer 220 (the membrane layer is hidden behind the metal layer), a series of apertures 224 are arranged in a substantially regular array for illustration only. As mentioned earlier, the array of apertures 224 may also be arranged in a substantially irregular or random array or any combination thereof. The diameter of each aperture, $d_a$, may be substantially uniform as depicted in FIG. 7 or may vary in size within the membrane:metal layer. The spacing distance of the micron centers of the apertures 224 with its neighboring apertures represented by $d_{mc}$, may be substantially uniform in distance as depicted in FIG. 7 or may vary in distance within the membrane:metal layer.

In the light reflecting state shown in FIG. 6A, particles 214 are attracted inwardly under an applied electric field towards the rear backplane electrode 208 where they accumulate. In the light absorbing state shown in FIG. 6B, particles 214 are attracted outwardly to and accumulate atop metal layer 220 and adjacent hemi-spherical surface 202, preventing layer 220 from reflecting light rays outwardly through the pupil region towards the viewer of the hemi-beads which form hemispherical surface 202. More particularly, in the light reflecting state, a substantial fraction of the light rays passing through transparent outward sheet 204 undergo TIR at the inward side of hemi-spherical surface 202. For example, representative incident light ray 226 is refracted through surface 204 and hemispherical surface 202. Ray 226 undergoes TIR two or more times at the bead:liquid TIR interface, as indicated at points 228 and 230. The totally internally reflected rays are then refracted back through hemispherically-contoured surface 202 and sheet 204 and emerges as ray 232, achieving a "white" appearance in each reflection region or pixel of the display 200.

Some incident light rays, such as representative light ray 234, are refracted through surface 204 and hemispherically-contoured surface 202 but do not undergo TIR at the bead:liquid TIR interface. Instead, ray 234 passes through hemispherically-contoured surface 202 and is reflected outwardly by metal layer 220 toward surface 202 and the viewer. The reflected ray is then refracted back through the pupil region of hemispherically-contoured surface 202 and sheet 204 and emerges as ray 236, again achieving a "white" appearance and improving the brightness of display 200.

Some other incident light rays, such as representative ray 238, are "lost" in the sense that they do not emerge outwardly from display 200. For example, ray 238 is refracted through surface 204 and hemispherically-contoured surface 202, but does not undergo TIR at the bead:liquid TIR interface and is not reflected by metal layer 220. Instead, ray 238 passes through one of membrane 204's apertures 224 and is absorbed, for example, at an inner wall portion of the aperture, as shown in FIG. 6A.

A switchable voltage (i.e. electric field) can be applied across electrophoresis medium 212 via electrodes 208 and 220 as indicated in FIGS. 6A and 6B, respectively. When a pixel of display 200 is switched to the light absorbing state shown in FIG. 6B, particles 214 are electrophoretically moved outwardly through membrane 216's apertures 224 toward electrode 220. The moved particles 214 form a relatively thick layer atop electrode 220, such that the electrophoretically mobile particles 214 make optical contact with the inward side of hemispherically-contoured surface 202, thus frustrating TIR (i.e. particles 214 are within about 0.25 micron of hemispherically-contoured surface 202, or closer). When electrophoretically moved as aforesaid, particles 214 scatter or absorb light, by modifying the imaginary and possibly the real component of the effective refractive index at the hemi-bead:liquid TIR interface. This is illustrated by light rays 240, 242, 244 and 246 which are scattered and/or absorbed as they strike particles 214 inside the evanescent wave region at the bead:liquid TIR interface, as indicated at points 248, 250, 252 and 254, respectively, thus achieving a "dark" appearance in each non-reflective absorption region or pixel of the display. The net optical characteristics of display 200 can be controlled by controlling the voltage applied across medium 212 via electrodes 208 and 220. The electrodes can be segmented to control the electrophoretic activation of medium 212 across separate regions or pixels of hemispherically-contoured surface 202, thus forming an image.

Another factor to consider is the appropriate relative spacing and alignment of transparent outward sheet 204, membrane:metal layer and rear electrode layer 208 can be achieved by providing loose or attached spacer beads and/or spacers (not shown) or a combination thereof on sheet 204, on rear electrode layer 208 or on the membrane:metal layer or combinations thereof. The spacing between the hemispherically-contoured surface 202 and metal layer 220 atop membrane 216 is at least about 2 microns. More preferably the spacing between the hemispherically-contoured surface 202 and metal layer 220 atop membrane 216 is about 4 microns to about 6 microns. The spacing between the rear backplane electrode 208 and the bottom of membrane 216 facing the backplane electrode 208 is at least about 10 microns. More preferably the spacing between the rear backplane electrode 208 and the bottom of membrane 216 facing the backplane electrode 208 is about 30 microns to about 50 microns. The spacing between the hemispherically-contoured surface 202 and backplane electrode surface 208 that forms the reservoir cavity 210 is overall at least about 25 microns and more preferably about 30 microns to about 80 microns. In addition to the diameter of the apertures, $d_a$, and the spacing between the micron centers, $d_{mc}$, display 200's switching speed is further dependent on the time required for particles 214 to move throughout the display as it is switched between the non-reflective and reflective states. Thus, the spacing distance between the various layers of the display is critical.

Figure 8:
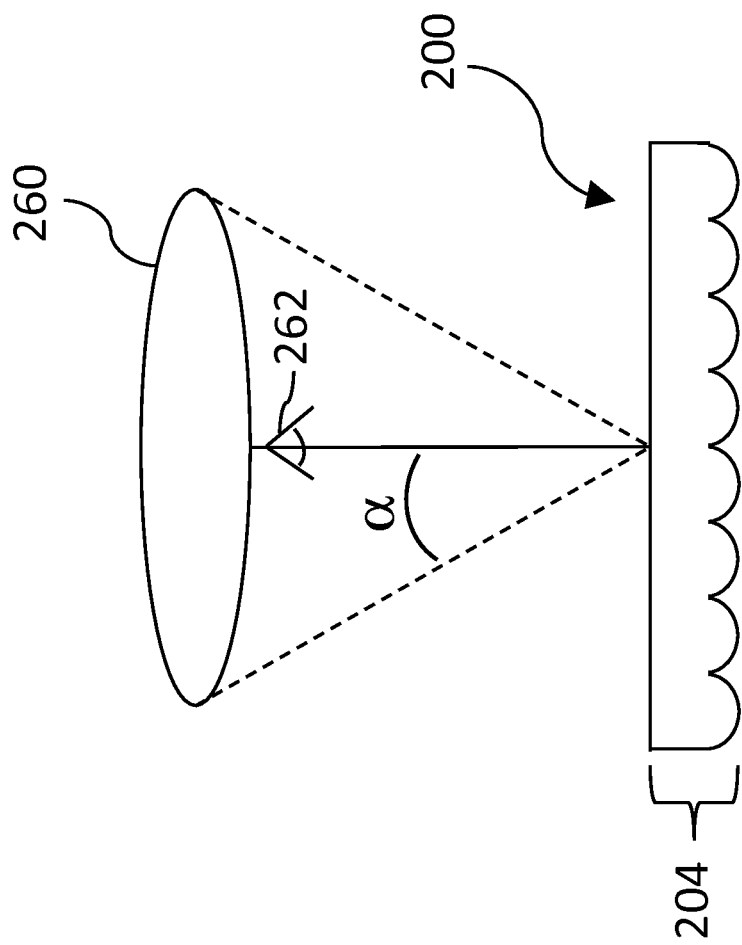
FIG. 8 illustrates the illumination of a display with a hemispherically-contoured surface in a semi-retro-reflective manner by a diffuse light source subtending an angle $\alpha$.

The reflectance of the surface is defined as the ratio of the luminance of the display to the luminance of a diffuse white reflectance standard (typically having a perfectly diffuse, or Lambertian, reflectance of 98%) measured using the same technique and under the same illumination conditions. The reflectance of a surface that exhibits semi-retro-reflective characteristics depends on the nature of the illumination conditions. If the surface is viewed in a perfectly diffuse illumination environment, there will be no apparent increase in reflectance caused by the semi-retro-reflective characteristics. In contrast, if the surface is viewed in an illumination environment that is not perfectly diffuse, a surface that exhibits semi-retro-reflective characteristics may have an apparent increase in reflectance. Such a lighting environment as shown in FIG. 8 on the outer surface of display 200 can be caused by illumination by a diffuse light source 260 subtending a half-angle of α, where to the extent that α is less than 90°, the apparent reflectance will increase as viewed by a viewer 262. In one embodiment where, for example, high brightness is preferred, each hemisphere in hemispherically-contoured surface 202 may have a diameter of about 20 microns. The porous membrane:metal structure is a substantially flat sheet about 12.15 microns thick with the membrane being a thickness of about 12 microns while the metal layer a thickness of about 0.15 microns. The membrane:metal layer is perforated with about 12 micron diameter apertures 224 spaced on roughly 30 micron centers, such that the area fraction of apertures 224 on the membrane:metal layer structure is about 12%. The spacing between the hemispherically contoured surface 202 and the metal layer 220 on the membrane:metal layer is about 5 microns while the spacing between the bottom of the membrane layer 216 and top surface of the rear electrode layer 208 is about 50 microns making the total distance from the hemispherically-contoured surface 202 and rear electrode surface about 65 micron. In this embodiment, approximately 88% of the light rays incident on metal layer 220 do not encounter one of apertures 224 and are reflected by metal layer 220. If the metal has a reflectance of approximately 80% as a result of approximately 20% absorption (such as is the case for a reflective layer of aluminum), then the membrane:metal layer will have an overall reflectance of approximately 70% (i.e. 80% reflection of 88% of the light rays incident on the membrane:metal layer).

In another embodiment where a higher switching speed, for example, is preferred, each hemisphere in hemispherically-contoured surface 202 may have a diameter of about 5 microns. Membrane:metal layer structure is substantially a flat sheet about 10 microns thick with the membrane being a thickness of about 10 microns while the metal layer a thickness of about 0.10 microns. The membrane:metal layer is perforated with about 12 micron diameter apertures 224 spaced on roughly 20 micron centers, such that the area fraction of apertures 224 on the membrane:metal layer structure is about 16%. The spacing between the hemispherically-contoured surface 202 and the metal layer 220 on the membrane:metal layer is about 10 microns while the spacing between the bottom of the membrane layer 216 and top surface of the rear electrode layer 208 is about 30 microns making the total distance from the hemispherically-contoured surface 202 and rear electrode surface about 50 microns. In this embodiment, approximately 84% of the light rays incident on metal layer 220 do not encounter one of apertures 224 and are reflected by metal layer 220. If the metal has a reflectance of approximately 80% as a result of approximately 20% absorption (such as is the case for a reflective layer of aluminum), then the membrane:metal layer will have an overall reflectance of approximately 67% (i.e. 80% reflection of 84% of the light rays incident on the membrane:metal layer. It should be noted that not only speed and brightness should be considered when factoring in the diameter, $d_a$, of the apertures 224 and the spacing of the apertures, $d_{mc}$, but also the structural rigidity and stability of the resulting porous membrane:metal layer. The more porous a structure is the weaker it may become unless a thicker membrane is used or alternative and potentially more costly materials are to be used.

In the reflective state, shown in FIG. 6A, typically about half of the light rays incident on sheet 204 are reflected by TIR. The remaining light rays reach membrane:metal layer structure and 70% of those rays are reflected by metal layer 220. In a perfectly diffuse illumination environment where there is no gain in reflectance as a result of semi-retro-reflection, such an embodiment is about 87% reflective, where 36% of the reflectance is a result of total internal reflection of light incident on the hemispheres and 51% of the reflectance (i.e. 80% of the remaining 64% of the incident light that travel through the so-called "dark pupil" region of the hemispheres) is a result of light rays that do not encounter one of apertures 224 and are reflected by metal layer 220. Furthermore, if the membrane:metal layer is positioned approximately at the focal plane of hemispherically-contoured surface 202, metal layer 220 will semi-retro-reflect light rays, achieving an optical gain enhancement for all of the reflected light rays. In a lighting environment described by FIG. 8, where a diffuse light source 260 subtending a half-angle of α directs light onto the outward surface of outward sheet 204 from overhead (i.e. from above the display viewer's head) or somewhat from behind, rather than the primary source of illumination being positioned in front of the viewer 262, this embodiment will have a reflectance of about 157%, approximately 1.8 times greater than the reflectance in a perfectly diffuse illumination environment.

In the display embodiments described herein, they may be used in applications such as in, but not limited to, electronic book readers, portable computers, tablet computers, wearables, cellular telephones, smart cards, signs, watches, shelf labels, flash drives and outdoor billboards or outdoor signs.

Embodiments described above illustrate but do not limit this disclosure. While a number of exemplary aspects and embodiments have been discussed above, those of skill in the art will recognize certain modifications, permutations, additions and sub-combinations thereof. Accordingly, the scope of this disclosure is defined only by the following claims.

What is claimed is:

1. A totally internally reflective display with a brightness enhancing structure to substantially absorb a reflecting light ray at an evanescent region, the display comprising:
   an optically transparent sheet having a surface further comprising a plurality of hemispherical protrusions on the inward side of the sheet;
   a backplane electrode;
   an apertured membrane between said optically transparent hemispherical surface and the backplane electrode;
   a light reflecting electrode on an outward side of the membrane;
   a single electrophoresis medium contained between said optically transparent hemispherical surface and the backplane electrode;
   a plurality of electrostatically charged light absorbing electrophoretically mobile particles suspended in the medium; and
   a voltage source to apply a voltage across the medium, between the light reflecting electrode and the backplane electrode to thereby modify the evanescent region to substantially absorb the reflecting light ray at the hemispherical surface.

2. The reflective display according to claim 1, wherein the voltage source is switchable to apply:
   a first voltage between the light reflecting electrode and the backplane electrode, to move substantially all of the particles inwardly through the apertured membrane toward the backplane electrode; and
   a second voltage between the light reflecting electrode and the backplane electrode, to move substantially all of the particles outwardly through the apertured membrane toward the light reflecting electrode.

3. The reflective display according to claim 1, wherein:
movement of the particles outwardly through the apertured membrane toward the light reflecting electrode frustrates total internal reflection of light rays at the hemispherical surface;
movement of the particles inwardly through the apertured membrane toward the backplane electrode permits:
total internal reflection of light rays at the hemispherical surface; and
outward reflection from the light reflecting electrode toward the hemispherical surface of light rays which pass inwardly through the hemispherical surface.

4. The reflective display according to claim 1 wherein the backplane electrode comprises a thin film transistor array.

5. The reflective display according to claim 1 wherein the apertured membrane comprises a polymer or glass.

6. The reflective display according to claim 5 wherein the thickness of the apertured membrane is at least about 5 microns.

7. The reflective display according to claim 6 wherein the thickness of the apertured membrane is about 10 microns to about 20 microns.

8. The reflective display according to claim 6 wherein the diameter of the apertures in the apertured membrane are at least about 5 microns.

9. The reflective display according to claim 8 wherein the diameter of the apertures in the apertured membrane are about 10 microns to about 15 microns.

10. The reflective display according to claim 8 wherein the apertures in the apertured membrane are organized in a substantially regular or irregular array.

11. The reflective display according to claim 10 wherein the center of the apertures in the apertured membrane are spaced at least about 10 microns.

12. The reflective display according to claim 11 wherein the center of the apertures in the apertured membrane are spaced about 25 microns to about 35 microns.

13. The reflective display according to claim 1 wherein the light reflective electrode comprises a metal.

14. The reflective display according to claim 13 wherein the thickness of the light reflective electrode is at least about 0.040 microns.

15. The reflective display according to claim 14 wherein the thickness of the light reflective electrode is about 0.10 microns to about 0.20 microns.

16. The reflective display according to claim 1 further comprising spacers or spacer beads.

17. The reflective display according to claim 1 wherein the gap between the transparent hemispherical surface and the light reflecting electrode is at least about 2 microns.

18. The reflective display according to claim 17 wherein the gap between the optically transparent hemispherical surface and the light reflecting electrode is about 4 microns to about 6 microns.

19. The reflective display according to claim 1 wherein the gap between membrane and the backplane electrode is at least about 10 microns.

20. The reflective display according to claim 19 wherein the gap between membrane and the backplane electrode is about 30 microns to about 50 microns.

21. The reflective display according to claim 1 wherein the electrophoretically mobile particles are comprised of an organic material or an inorganic material or a combination of an inorganic and organic material.

22. The reflective display according to claim 1 wherein the light reflecting electrode is positioned approximately at the focal plane of the hemispherical surface.

23. The reflective display according to claim 1 wherein the medium is comprised of a hydrocarbon or a fluorocarbon or a combination of a hydrocarbon and fluorocarbon.

24. The reflective display according to claim 1 wherein the optically transparent sheet having a surface comprising of a plurality of hemispherical protrusions may be formed by any one of embossing, etching, molding, self-assembly, printing, lithography or micro-replication.

25. The reflective display according to claim 1 wherein the display defines one of an electronic book reader, portable computer, tablet computer, wearable, cellular telephone, smart card, sign, watch, shelf label, flash drive, outdoor billboards or outdoor signs.

26. A Totally Internally Reflective (TIR) display with a brightness enhancing structure to substantially absorb a reflecting light ray at an evanescent region, comprising:
an optically transparent sheet having an internal and external surface, the internal surface of the optically transparent sheet further comprising a plurality of hemispherical protrusions;
a backplane electrode;
a membrane positioned between the optically transparent hemispherical surface and the backplane electrode, the membrane having a plurality of openings wherein each opening is sized to provide passage to one or more electrophoretically mobile solid particle; and
a first electrode positioned on an outward side of the membrane;
wherein the first and the second electrode exclusively are configurable to form a magnetic flux in the display.

27. The TIR display of claim 26, wherein the display is further configured to receive a fluidic medium having the one or more electrophoretically mobile solid particle suspended therein.

28. The TIR display of claim 26, wherein the membrane further comprises a reflective surface positioned proximal to the plurality of hemispherical protrusions.

29. The TIR display of claim 26, wherein the optically transparent sheet is substantially charge-inert.

* * * * *